United States Patent Office 3,507,842
Patented Apr. 21, 1970

1

3,507,842
METHOD FOR SUPPRESSING MOLECULAR WEIGHT INCREASES DURING THE WATER - DEACTIVATION OF TRANSITION-METAL BASED ANIONIC-COORDINATION CATALYSTS
Hal G. Ginn, Baker, La., assignor to Copolymer Rubber & Chemical Corporation, a corporation of Louisiana
No Drawing. Continuation-in-part of application Ser. No. 553,311, May 27, 1966. This application Aug. 3, 1966, Ser. No. 569,836
Int. Cl. C08f 15/40
U.S. Cl. 260—80.78     5 Claims

ABSTRACT OF THE DISCLOSURE

The presence of molecular jump during deactivation of Ziegler type catalyst in the interpolymerization in solution of ethylene, propylene and a bridged ring compound selected of 5-ethylidene-2-norbornene, 5-methylene-2-norbornene and 5-isopropylene-2-norbornene by substantially instantaneous admixture of water with the solution less than 1 minute after polymerization has been completed with the water present in an amount within the range of 0.1 to 5 volumes of solution.

This application is a continuation-in-part of my co-pending application Ser. No. 553,311, filed May 27, 1966 for Preparation of Elastomers.

This invention relates to a novel process for preparing sulfur-vulcanizable elastomers by solution polymerization of a monomeric mixture of alpha-monoolefins and an ethylenically unsaturated monomer containing a plurality of carbon-to-carbon double bonds in the presence of a Ziegler polymerization catalyst whereby molecular jump may be suppressed during the subsequent deactivation of the catalyst.

When polymerizing a monomeric mixture including alpha-olefins and an ethylenically unsaturated monomer containing a plurality of carbon-to-carbon double bonds in solution in an inert organic solvent and in the presence of a Ziegler catalyst following prior art practices, it is necessary to deactivate the catalyst in the resulting solution of polymer by addition of a polar compound such as an alcohol or water. In most instances, it is preferred to use water as the catalyst deactivating agent as it may be readily removed from the organic solvent and the organic solvent may be recycled in the process. However, it has been found that the molecular weight of the dissolved polymer increases drastically when deactivating the catalyst with water in accordance with the prior art process. This drastic increase in the molecular weight is referred to as molecular jump, and it results in a less desirable or even unsatisfactory crosslinked elastomer of poor processibility. An effective process for controlling or suppressing molecular jump when deactivating the catalyst with water would be of great practical value, as alcohols and other organic polar compounds which contaminate the organic solvent could be eliminated from the polymerization system. However, a satisfactory process was not available prior to the present invention.

It is an object of the present invention to provide a novel process for preparing sulfur vulcanizable elastomers wherein molecular jump may be suppressed or prevented when the catalyst is deactivated with water.

It is a further object to provide a novel process for preparing elastomers by polymerizing monomeric mixtures including alpha-monoolefins and an ethylenically unsaturated monomer containing a plurality of carbon-to-carbon double bonds in solution in an organic solvent and in the presence of a Ziegler catalyst whereby the active Ziegler catalyst in the resulting solution of elastomer may be deactivated and the catalyst residues removed by addition of water without causing a drastic increase in the molecular weight.

It is still a further object of the invention to provide a novel continuous polymerization process wherein molecular jump is suppressed or prevented while deactivating a Ziegler catalyst in a continuously flowing stream of a solution of elastomer by addition of water.

Still other objects and advantages of the invention will be apparent to those skilled in the art upon reference to the following detailed discussion and the examples.

When deactivating a Ziegler catalyst contained in a solution of elastomer prepared by polymerizing a monomeric mixture of alpha-monoolefins and one or more ethylenically unsaturated monomers containing a plurality of carbon-to-carbon double bonds in an organic solvent, it has been discovered that molecular jump may be suppressed or even prevented by addition of water in such a manner that it is substantially instantaneously admixed with the elastomer solution. It is essential that the water be added in large excess over the quantity theoretically required for killing the catalyst, and that the water be admixed with the elastomer solution using extremely vigorous agitation. Otherwise, acceptable results are not obtained.

One very effective method of assuring that the added water is substantially instantaneously dispersed throughout the solution of elastomer is by means of a high speed in-line mixer to which continuous streams of elastomer solution and water are fed and intermixed therein. The volume of the in-line mixer should be relatively small, and the flow rates of the elastomer solution and water should be relatively low so that the contents may be thoroughly agitated. Also, the water may be fed adjacent to the agitation means at the point of greatest turbulence, so that it is immediately intermixed throughout the entering stream of solution polymer. For example, the in-line mixer may contain one or more rapidly rotating impeller-type agitators and the stream of water may be fed immediately adjacent the periphery of the rotating impeller at the point of greatest turbulence. For better results, the impeller-type agitators should be driven sufficiently fast to impart energy to the mixture at the rate of at least ⅛ horsepower per gallon, and preferably at the rate of ⅛–1 horsepower per gallon of mixture. Best results are usually obtained when about ¼–½ horsepower per gallon of mixture is used.

As a general rule, the water must be admixed with the organic solvent solution of elastomer containing the active catalyst under turbulent conditions of agitation as defined by Reynold's numbers within the turbulent range for the specific mixture of water and elastomer solution. The Reynold's number usually should be at least 2000 to 4000, and preferably at least 5000. Suitable Reynold's numbers within the turbulent ranges for most mixtures are usually about 2000–100,000 and preferably about 5000–50,000.

The amount of water to be intermixed with the solution of elastomer may vary over wide ranges and it is only necessary to use sufficient water to kill the catalyst while suppressing or preventing molecular jump. However, it is usually preferred that not less than 0.1 volume of water per unit volume of elastomer solution be intermixed. Much larger quantities of water may be employed, such as 0.1–5, and for better results about 0.1–1 volumes of water for each volume of elastomer solution. In most instances, approximately 0.25–0.50 volume of water per volume of elastomer solution is preferred.

It is preferred that the water be admixed with the elastomer solution shortly after polymerization is completed, e.g., shortly after the elastomer solution is withdrawn from the reactor, and preferably within 10 minutes after completing polymerization. Best results are usually obtained when the water is intermixed with the elastomer solution in 5 minutes or less, e.g., not more than 15 seconds to 1 minute, after it is withdrawn from the reactor. If the elastomer solution is withdrawn from the reactor and allowed to stand for more than about 10 minutes, then the delay adversely affects the removal of the catalyst residues by the excess water. The catalyst, upon standing under non-ideal polymerization conditions for an extended period, tends to form insoluble components which are not readily removed by the normal water wash. Accordingly, the elastomer solution should be thoroughly and intimately contacted with the water shortly after it is withdrawn from the reactor. Preferably, the elastomer solution is withdrawn from the reactor as a continuously flowing stream and immediately thereafter mixed with a continuously flowing stream of water under the critical agitation conditions described herein.

Prior art reaction conditions may be used when preparing the solution of elastomer containing the active catalyst to be deactivated in accordance with the invention. Examples of patents which disclose satisfactory procedures for preparing elastomers from monomeric mixtures of alpha monoolefins and polyenes include United States Patents No. 2,993,480, 3,093,620, 3,093,621 and 3,211,709, the disclosures of which are incorporated herein by reference. Halogen substituted polyenes and especially chlorine substituted polyenes, or substituted polyenes containing other types of substituents which do not adversely affect the polymerization, may be present in the monomeric mixture to be polymerized. Thus, one or more suitable substituted or unsubstituted monomers in general which contain a plurality of carbon-to-carbon double bonds may be interpolymerized with a mixture of alpha monoolefins to produce elastomers. Examples of halogenated polyunsaturated monomers are disclosed in United States Patents No. 3,220,988 and 3,222,330. The polymerization procedures disclosed in the above references produce a solution of the elastomer in an organic solvent which contains the active Ziegler polymerization catalyst. The catalyst is deactivated in accordance with the invention prior to recovery of the solid elastomer from the solution.

The specific monomers and ratios of monomers to be polymerized need not differ from those used in the prior art for preparing elastomers. In many instances, it is preferred that the elastomers be prepared from a monomeric mixture containing ethylene, propylene and a polyene or substituted polyene. The elastomer may contain chemically bound therein molar ratios of ethylene to propylene varying between 80:20 and 20:80, and preferably between 70:30 and 55:45. The polyene may be chemically bound therein in an amount to provide an actual unsaturation level of not more than about 2 carbon-to-carbon double bonds per 1000 carbon atoms in the polymer chain; however, much higher actual unsaturation levels are possible such as for example, 5, 10, 20, 25, 30, 60, 100 or more carbon-to-carbon double bonds per 1000 carbon atoms in the polymer. The specific unsaturation level that is selected in a given instance will vary depending upon the cure rate and other properties which are desired in the elastomer. The invention is especially useful when preparing polymers containing actual unsaturation levels of about 7–30, and preferably about 10–20, carbon-to-carbon double bonds per 1000 carbon atoms.

For some reason which is not fully understood at the present time, polymers prepared from monomeric mixtures containing ethylene, at least one higher straight chain alpha monoolefin having 3–16 carbon atoms such as propylene, and certain polyenes such as 5-ethylidene-2-norbornene, have a much more rapid cure rate when cured with sulfur than would be predicted from the actual carbon-to-carbon double bond content. In such instances, the apparently higher unsaturation level is embraced within the term "effective" unsaturation level of the polymer in the specification and claims. As is set out in detail in Example III hereinafter, the foregoing polymers may be analyzed to determine the effective unsaturation level by the consumption of bromine, correcting for the substitution reaction by a kinetic method based on the spectrophotometric method developed by Siggia et al. Anal. Chem. 35, 362 (1963). The effective carbon-to-carbon double bond content per 1000 carbon atoms in the polymer, which may or may not be equal to the actual carbon-to-carbon double bond content, is calculated from the resulting data to determine the effective unsaturation level. The effective unsaturation level may be, for example, about 2–60 carbon-to-carbon double bonds per 1000 carbon atoms in the polymer. Polymers having effective unsaturation levels of 7–30, and for better results 10–20, carbon-to-carbon double bonds per 1000 carbon atoms usually are preferred when preparing blends with highly unsaturated rubbers such as diene rubbers.

In instance where it is desired to prepare a tetrapolymer, or a polymer containing five or more different monomers, then one or more straight chain alpha monoolefins containing 4–16 and preferably 4–10 carbon atoms should be substituted for an equal molar quantity of bound propylene in the above-mentioned polymer composition. For instance, the preferred range of the fourth monomer in tetrapolymers will usually be about 5–20 mol percent, but a smaller amount such as 1, 2, 3 or 4 mol percent may be used.

The polymerization solvent may be any suitable inert organic solvent which is liquid under the reaction conditions, and it may be a prior art solvent for solution polymerization of monoolefins in the presence of Ziegler catalysts. Examples of satisfactory hydrocarbon solvents include straight chain paraffins containing 5–8 carbon atoms, of which hexane often gives the best results; aromatic hydrocarbons and especially those containing a single benzene nucleus such as benzene, toluene, etc.; and saturated cyclic hydrocarbons which have boiling ranges approximating those for the straight chain paraffin hydrocarbons and aromatic hydrocarbons discussed above, and especially saturated cyclic hydrocarbons containing 5 or 6 carbon atoms in the ring. The solvent selected may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfer with the Ziegler catalyst to be used in the polymerization step.

Catalysts in accordance with the prior art may be used. In general, any suitable prior art Ziegler-type catalyst may be used which is known to produce a satisfactory elastomer. Ziegler catalysts are disclosed in a large number of issued patents, such as United States Patents Nos. 2,933,480, 3,093,620, 3,093,621, 3,211,709 and 3,113,115. Examples include metal organic coordination catalysts prepared by contacting a compound of a metal of Groups IVa, Va, VIa and VIIa of the Mendelejeff periodic chart of the elements, as typified by titanium, vanadium and chromium halides, with an organometallic compound of a metal of Groups I, II or III of the Mendelejeff periodic chart which contains at least one carbon-to-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxychloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually 1 mol of vanadium oxychloride for each 4–10 mols of the alkyl aluminum sesquichloride to thereby provide a ratio of aluminum to vanadium of 8:1 to 20:1.

The polymerization is preferably carried out on a continuous basis in a dry prior art reaction vessel closed to the outside atmosphere, which is provided with an agitator, reactor cooling means, and conduit means for continuously supplying the ingredients of the reaction mixture including monomers and catalyst, and conduit means for continuously withdrawing the solution of elastomer. The polymerization is carried out in liquid phase in the organic solvent in the presence of the Ziegler catalyst. Preferably, a stream of the solution of elastomer is withdrawn continuously from the reaction vessel, the catalyst is killed by continuous addition of a stream of water under the agitation conditions described herein, and then the organic solvent is removed. The solvent may be removed by injecting the solution below the liquid level of a body of boiling water maintained in a vessel to which steam is supplied. The resulting polymer crumb is removed as a slurry from the vessel, and the polymerization solvent is withdrawn overhead as a vapor. The polymer crumb may be stripped free of traces of solvent and washed free of catalyst residues, followed by separating water from the crumb by means of a shaker screen or other device, and drying of the crumb by means of a prior art extrusion dryer or apron dryer. The dried crumb is then ready for baling in accordance with prior art practice.

The polyene may be one of those disclosed in the prior art for use as third monomers in the preparation of ethylene-propylene-polyene terpolymers, including open chain polyunsaturated hydrocarbons containing 5–20 carbon atoms such as 1,4-hexadiene, monocyclic polyenes, and polycyclic polyenes. The polyunsaturated bridged-ring hydrocarbons or bridged-ring halogenated hydrocarbons containing a plurality of carbon-to-carbon double bonds are usually preferred. Examples of the bridged-ring hydrocarbons include the polyunsaturated derivatives of bicyclo(2,2,1)heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged-ring hydrocarbons include polyunsaturated derivatives of bicyclo(2,2,2)octane as represented by bicyclo(2,2,2)octa-2,5-diene, polyunsaturated derivatives of bicyclo(3,2,1)octane, polyunsaturated derivatives of bicyclo(3,3,1)nonane, and polyunsaturated derivatives of bicyclo(3,2,2)nonane. At least one double bond is present in a bridged-ring of the above compounds, and at least one other double bond is present in a bridged ring or in a side chain. Further examples of polyunsaturated bridged-ring hydrocarbons and their use in the preparation of prior art elastomers are found in United States Patents Nos. 2,933,480, 3,093,620, 3,093,621 and 3,211,709, the disclosures of which are incorporated herein by reference.

The elastomers which are especially preferred contain chemically bound therein molar ratios of ethylene to propylene varying between 70:30 and 55:45. Specific examples of preferred polyenes which may be used in this elastomer composition include 5-methylene-2-norbornene, 5 - ethylidene-2-norbornene, 5 - n - propylidene-2-norbornene, 5 - isopropylidene-2-norbornene, 5 - n - butylidene-2-norbornene, 5 - isobutylidene-2-norbornene, dicyclopentadiene, the methyl butenyl norbornenes such as 5 - (2 - methyl-2-butenyl)-2-norbornene or 5-(3-methyl-2-butenyl)norbornene, and 5 - (3,5-dimethyl-4-hexenyl)-2-norbornene. The elastomer prepared from 5-ethylidene-2-norbornene is preferred as it has outstanding properties and produces many unusual and unexpected results.

The present invention is especially useful in the preparation of sulfur-curable elastomers from monomeric mixtures including certain polyenes which have a pronounced tendency to cause molecular jump. Examples of such polyenes include the bridged ring polyenes mentioned herein, and especially 5-methyl-ene-2-norbornene, 5-ethylidene-2-norbornene, 5-isopropylidene-2-norbornene, and dicyclopentadiene. Polyenes in general which have strained or highly active unsaturation exhibit a greater tendency to cause molecular jump and the invention is most useful when these monomers are present in the monomeric mixture to be polymerized.

The foregoing detailed description and the following specific examples are for purposes of illustration only, and are not intended as being limiting to the spirit or scope of the appended claims.

EXAMPLE I

The reaction vessel employed in this example was a one-half gallon Sutherland reactor equipped with a high speed, heavy-duty, air driven motor, cooling coils, a thermometer, a temperature regulator, a pressure regulator, an injection port, and other openings where monomers, catalyst, and solvent were fed to the reactor. A tube dipping to the bottom of the reactor was present for the removal of the cement which was produced on a continuous basis. A vapor phase vent was provided to bleed off 15% of the gaseous monomer feed to prevent inert gas buildup.

The clean reactor was assembled, rinsed with dry hexane and purged overnight with dry nitrogen. On the next morning, the reactor bowl was heated with a flameless blow-torch and hot water was run through the coils until the temperature in the reactor was about 70° C. Propylene was flushed through the reactor for about 15 minutes, and the temperature was lowered to ambient. One liter of Esso chemical grade hexane, dried over 4A molecular sieves and stored over sodium, was added to the reactor. As the temperature was brought to 40° C., propylene was fed to the reactor through a 4A molecular sieve column until 43.1 inches of mercury pressure was reached. The pressure was then brought up to 61.0 inches of mercury with ethylene fed through a 4A molecular sieve column and 2.5 millimoles (0.34 cc.) of high purity 5-ethylidene-2-norbornene and 1.3 cc. of 1.5 molar ethylaluminum sesquichloride were added.

The monomers were shut off and the catalyst components, i.e., a 0.302 molar solution of ethylaluminum sesquichloride and a 0.030 molar solution of vanadium oxytrichloride at a 12 to 1 aluminum to vanadium ratio, were fed into the reactor at a constant rate until a drop in the pressure in the reactor was noted. At this time the gaseous monomers were fed into the reactor through suitably calibrated rotormeters at a rate of 1412 cc./minute, which volume contained 683 cc. of ethylene and 729 cc. of propylene. The 5-ethylidene-2-norbornene was added as a 0.20 molar solution in hexane at 1.39 cc./minute and this amount provided about 2.3 weight percent for incorporation into the polymer. The polymerization was controlled by the catalyst pumps which added catalyst on demand as the pressure increased, thus maintaining the 61.0 inches of mercury pressure throughout the run. When the solution in the reactor contained approximately 6% polymer by weight, fresh solvent containing 16 cc. of ethylene per cc. of solvent was fed into the reactor at the rate of 28.2 cc./minute, and polymer cement was withdrawn which contained about 85 grams of polymer per hour.

At this time, the ethylene and propylene feeds were adjusted to 296 cc./minute and 1566 cc./minute, respectively, to compensate for the unreacted monomers removed with the cement. The feed rate of the 5-ethylidene-2-norbornene solution was adjusted to 1.71 cc./minute.

The solution of polymer as removed from the reactor was fed without agitation into water to kill the active catalyst. The cement was then washed three times with equal volumes of water. The washed cement was stabilized by addition of 1 part by weight for each 100 parts by weight of polymer of a prior art stabilizer (SDAO, a product of Naugatuck Chemical Co.) and fed with nitrogen pressure into a T joint at the bottom of a 4-liter container full of hot circulating water. The other end of the T was connected to a steam line and steam was admitted at a rate to superheat the rubber cement. The solvent and unreacted monomers were mostly removed by this procedure. The rubber crumb was collected on a screen, washed, chopped up in a Waring Blendor, and dried in an oven at 90° C. to remove any remaining solvent and water. The terpolymer had a mole ratio of chemically bound ethylene to propylene of 63:37 by infrared analysis, using the 720 cm.$^{-1}$ absorbance for ethylene and the 968 cm.$^{-1}$ absorbance for propylene. The terpolymer contained 3.5% gel and had a reduced specific viscosity (0.1% in Decalin at 135° C.) of 4.03. The terpolymer was crosslinked, and it was almost unprocessible. A solution containing 0.1 g. of polymer dissolved in 100 cc. of Decalin was used in this and the following examples when measuring the reduced specific viscosity.

EXAMPLE II

The procedure of Example I was repeated except as noted hereinafter.

The polymerization temperature was 45° C., and 2.2 millimoles of the 5-ethylidene-2-norbornene was added during the initial change. The catalyst was prepared from a 0.351 molar solution of ethylaluminum sesquichloride and a 0.0363 molar solution of vanadium oxytrichloride using a 12:1 aluminum to vanadium ratio.

The gaseous monomers were fed to the reactor at a rate of 1394 cc./minute, of which 680 cc. were ethylene and 714 cc. were propylene. The 5-ethylidene-2-norbornene was added as a 0.20 molar solution at the rate of 1.39 cc./minute, which provided 2.3 weight percent to be incorporated in the polymer. The pressure was maintained at 61.0 inches of mercury. When the solution in the reactor contained approximately 6 weight percent polymer, fresh solvent containing 16 cc. of ethylene per cc. of solvent was fed into the reactor at the rate of 28.4 cc. per minute. The polymer cement was produced at the rate of about 85 grams of polymer per hour.

At this time, the ethylene and propylene feeds were adjusted to 283 cc./minute and 1469 cc./minute, respectively, to compensate for the unreacted monomers removed with the cement. The feed rate of the 5-ethylidene-2-norbornene solution was increased to 1.79 cc./minute.

The solution cement as removed from the reactor was fed into a Waring Blendor containing water where it was intimately mixed under turbulent agitation conditions.

The resulting rubbery terpolymer had a mole ratio of chemically bound ethylene to propylene of 61:39 by infrared analysis, using the 720 cm.$^{-1}$ absorbance for ethylene and the 968 cm.$^{-1}$ absorbance for propylene. The terpolymer contained no gel and had a reduced specific viscosity (0.1% in Decalin at 135° C.) of 2.2.

The polymer was analyzed to determine the effective unsaturation level by the consumption of bromine by the method described hereinafter. The effective unsaturation level of the polymer, as determined by this method and expressed as carbon to carbon double bonds per 1000 carbon atoms, was about 4.0.

Curing of the dried rubber was effected by compounding the following ingredients in a Brabender plasticorder on a weight basis: 100 parts of rubber, 55 parts of a prior art commercially available naphthenic rubber processing oil, 5 parts of zinc oxide, 1 part of stearic acid, 0.75 part of mercaptobenzothiazole, 1.5 parts of tetramethylthiuram sulfide, and 1.5 parts sulfur. Curing was for 30 minutes at 160° C.

The cured properties as determined by standard ASTM methods D412–62T, D927–47, and D395–61–B are reported below. The hardness was determined on a Shore A durometer. The belt life is the time in hours necessary for a 0.032″ cut in a belt to grow to 5 times its original length when it is run on small pulleys in a chamber at 71° C. Heat rise (ΔT° F.) is by the Goodrich method. Dispersion is a visual rating of the compounded stock. The slope of the cure curve was determined on a Monsanto rheometer.

| | |
|---|---|
| Raw Mooney valve (ML$_4$) | 77 |
| Elongation (percent) | 500 |
| 300% modulus (p.s.i.) | 1375 |
| Tensile strength (p.s.i.) | 2750 |
| ΔT (° F.) | 90 |
| Hardness | 65 |
| Dispersion | Good |
| Belt life (hours) | 9.0 |
| Cure rate | 16 |

It is clear from the above data that the terpolymer of this example was readily processable and had excellent physical properties. On the other hand, the terpolymer of Example I was not readily processible and it had entirely unsatisfactory properties.

The elastomers described herein may be analyzed as set out below to determine the effective unsaturation level by the consumption of bromine correcting for the substitution reaction by a differential kinetic method based on the spectrophotometric method developed by Siggia et al., Anal. Chem. 35, 362 (1963). The basis of the method is the determination of the differences in rates of addition and substitution of bromine (Br$_2$) with ethylenically unsaturated linkages. The rate of reaction is determined by monitoring the disappearance of the bromine photometrically as a function of time. A sharp break occurs when the rapid addition reaction to the carbon-to-carbon double bonds is complete and the slow substitution reaction continues. Extrapolation of a kinetic plot (pseudo first order) to a time of O will give the amount of bromine remaining after addition to the carbon-to-carbon double bonds was complete. The change in bromine concentration is taken as the measure of the effective unsaturation level in the elastomer.

Materials (1) Bromine solution, 0.0125 Molar in CCl$_4$ (2.0 g. of Br$_2$/liter of CCl$_4$).

(2) Aqueous potassium iodide solution containing 10 grams of KI in 100 ml. of water.

(3) Mercuric chloride catalyst solution containing 0.2 g. of mercuric chloride dissolved in 100 ml. of 1,2-dichloroethane.

(4) Starch indicator solution.

(5) Aqueous sodium thiosulfate solution, 0.01 Normal accurately standardized.

(6) Carbon tetrachloride, reagent grade.

(7) Spectrophotometer (visible range) having sample and reference cells that can be stoppered.

(8) Stopwatch (if a non-recording photometer is used).

Calibration (1) With the standard 0.01 N Na$_2$S$_2$O$_3$ solution, titrate to the starch-iodine endpoint duplicate 10.00 ml. samples of the 0.0125 M bromine solution to which 5 ml. of the 10% KI solution and 25 ml. of distilled water have been added.

(2) From the standard 0.0125 M bromine solution, prepare a series of five calibration standards of the following concentrations: 0.5, 1, 2, 3, and 4 millimoles of $Br_2$/liter.

(3) Determine the absorbance in the sample cell of each of the five calibration standards at a wavelength setting of 415 m$\mu$[1] versus $CCl_4$ in the reference cell. Then prepare a plot from the resulting data of absorbance versus the exact concentration of $Br_2$ contained in the calibration standards, plotted as millimoles of $Br_2$/liter, to obtain a calibration curve.

(4) Determine the slope of the calibration curve thus obtained for use in the equation:

$Br_2$ in millimoles/liter
$$= \text{Absorbance} \times \frac{1}{\text{slope of calibration curve}}$$

Analysis (1) Dissolve about 1.25 grams of the dry polymer to be analyzed in 50 ml. of $CCl_4$ (or take sufficient polymer cement to contain about 1.25 grams of the polymer). Precipitate the polymer by pouring the solution into 400 ml. of isopropyl alcohol with vigorous stirring provided by a Waring Blendor.

(2) Filter the precipitated polymer and squeeze out the excess liquid.

(3) Dissolve the once precipitated polymer from Step 2 in 50 ml. of $CCl_4$, precipitate the polymer again by pouring into 400 ml. of isopropyl alcohol as in Step 1, and filter and remove excess liquid as in Step 2.

(4) Immediately redissolve the twice precipitated undried polymer from Step 3 in about 50 ml. of $CCl_4$ in a Waring Blendor. Filter the solution through glass wool into a 2-ounce narrow-mouthed bottle that can be stoppered to prevent evaporation. Determine the solids content by evaporation of duplicate 5.0 ml. samples of the polymer solution. A hypodermic syringe is convenient for measuring the polymer solutions.

(5) Set the spectrophotometer at the wavelength of 415 m$\mu$.

(6) Check the concentration of the 0.0125 M bromine solution daily before use by determining the absorbance of a known dilution.

(7) To the sample photometer cell, add 1.00 ml. of the 0.2% $HgCl_2$ solution as a catalyst, and 1.00 ml. of the standard 0.0125 M solution of bromine in $CCl_4$.

(8) Prepare a polymer blank by adding to the reference cell 1.00 ml. of the polymer solution from Step 4, 1.00 ml. of $CCl_4$ and 1.00 ml. of the 0.2% $HgCl_2$ solution, shake well, and place the photometer reference cell in the instrument.

(9) Discharge 1.00 ml. of the polymer solution[2] into the photometer cell containing the catalyst and bromine solution from a hypodermic syringe starting the stopwatch the instant of mixing (or the recorder if a recording spectrophotometer is used). Stopper the cell and thoroughly agitate the mixture before placing the cell in the instrument.

(10) Record the 415 m$\mu$ wavelength absorbance of the mixture at one minute intervals. Continue recording time and absorbance values until the faster addition rate of bromine to the double bonds is complete and the slower substitution reaction is well defined. (Usually 10–15 minutes is sufficient). Prepare a plot from the resulting data of absorbance versus time to obtain an absorbance curve for the analyzed sample.

Calculations (1) Extrapolate the linear portion of the absorbance curve (i.e., the portion for the substitution reaction) for the analyzed sample to zero time[3], and record the absorbance value for zero time.

(2) Determine the final $Br_2$ concentration by inserting the absorbance value at zero time which was obtained above, and the slope of the calibration curve, in the following equation. The final $Br_2$ concentration, which is the concentration of $Br_2$ at the end of the rapid addition reaction, is then calculated.

Final $Br_2$ concentration in millimoles/liter
$$= \text{Absorbance at zero time} \times \frac{1}{\text{slope of calibration curve}}$$

(3) Calculate the effective unsaturation level as carbon-to-carbon double bonds per 1000 carbon atoms in the polymer from the following equation:

Effective unsaturation level expressed as carbon-to-carbon double bonds per 1000 carbon atoms in the polymer
$$= \frac{(A-B)(C)(14)(100)}{(1000)(D)(E)}$$

Where

A = initial $Br_2$ concentration, millimoles/liter
B = final $Br_2$ concentration, millimoles/liter
C = milliliters of solution in the sample photometer cell
D = percent solids of polymer in the polymer solution (based on the weight of the polymer in grams/volume of the solvent in milliliters)
E = milliliters of the polymer solution in the sample photometer cell.

---

[1] The spectrophotometer should be adjusted to the wavelength setting of maximum absorption since the bromine absorption curve is very sharp and even small errors in the wavelength setting cannot be tolerated.

[2] The sample size selected will permit analysis of polymers containing 1 to 5 C=C/1000 carbon atoms. Polymers with unsaturation levels above this range can be analyzed but the polymer concentration must be reduced proportionately.

[3] Extrapolation of the absorbance curve for the sample being analyzed gives essentially the same results as extrapolation of a kinetic plot but with a considerable saving in time.

What is claimed is:

1. In a process for preparing elastomers wherein a monomeric mixture containing ethylene, propylene and 5-ethylidene-2-norbornene present in an amount to provide at least two carbon-to-carbon double bonds per 1000 carbon atoms in the elastomer is interpolymerized in solution in an organic solvent in the presence of an active Ziegler polymerization catalyst to produce a solution of the elastomer containing active catalyst, the catalyst is deactivated and thereafter the elastomer is recovered from the solvent solution, the elastomer being subject to molecular jump by a cross linking reaction when deactivated by the simple addition of aqueous medium to the solution of the elastomer, the improvement which comprises deactivation of the catalyst by the admixture of water with the solution by introduction of the water in an area of greatest turbulence for substantially instantaneous admixture with the solution less than 1 minute after polymerization has been completed and in which the water is introduced in an amount within the range of 0.1 to 5 volumes per volume of solution.

2. In a process as claimed in claim 1 in which the amount of water introduced for admixture with the solution is within the range of 0.1 to 1 volume of water per volume of solution.

3. In a process as claimed in claim 1 wherein the elastomer contains about 20–80 mol percent bound ethylene, about 80–20 mol percent of bound propylene and an amount of ethylidene 2-norbornene to provide an effective unsaturation level of about two carbon-to-carbon double bonds per 1000 carbon atoms in the elastomer.

4. In a process as claimed in claim 1 in which the amount of water admixed with the solution is within the range of 0.25 to 0.5 volume of water per volume of solution.

5. In a process for preparing elastomers wherein a monomeric mixture containing ethylene, propylene and a bridged ring alkylidene norbornene compound present in an amount to provide at least two carbon-to-carbon double bonds per 1000 carbon atoms in the elastomer is interpolymerized in solution in an organic solvent in the presence of an active Ziegler polymerization catalyst to produce a solution of the elastomer containing active catalyst, the catalyst is deactivated and thereafter the elastomer is recovered from the solvent solution, the elastomer being subject to molecular jump by a cross linking reaction when deactivated by the simple addition of aqueous medium to the solution of the elastomer, the improvement which comprises deactivation of the catalyst by the admixture of water with the solution by introduction of the water in an area of greatest turbulence for substantially instantaneous admixture with the solution less than 1 minute after polymerization has been completed and in which the water is introduced in an amount within the range of 0.1 to 5 volumes per volume of solution.

References Cited

UNITED STATES PATENTS

| | | | |
|---|---|---|---|
| 3,320,220 | 5/1967 | Di Drusco | 260—80.78 |
| 3,350,370 | 10/1967 | Keller | 260—80.78 |
| 3,316,233 | 4/1967 | Feay | 260—93.7 |

OTHER REFERENCES

Engel, Schafer and Kiepert: Rubber Age, December 1964, pp. 410–415 "Molecular Weight Jump Reaction."

JOSEPH L. SCHOFER, Primary Examiner

R. S. BENJAMIN, Assistant Examiner

UNITED STATES PATENT OFFICE

CERTIFICATE OF CORRECTION

Patent No. 3,507,842            Dated April 21, 1970

Hal G. Ginn

It is certified that error appears in the above-identified patent and that said Letters Patent are hereby corrected as shown below:

Col. 3, line 60, cancel "more" and substitute -- less --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents